J. F. BEAR.
SUSPENDER LINK.
APPLICATION FILED SEPT. 15, 1919.
1,341,033.
Patented May 25, 1920.
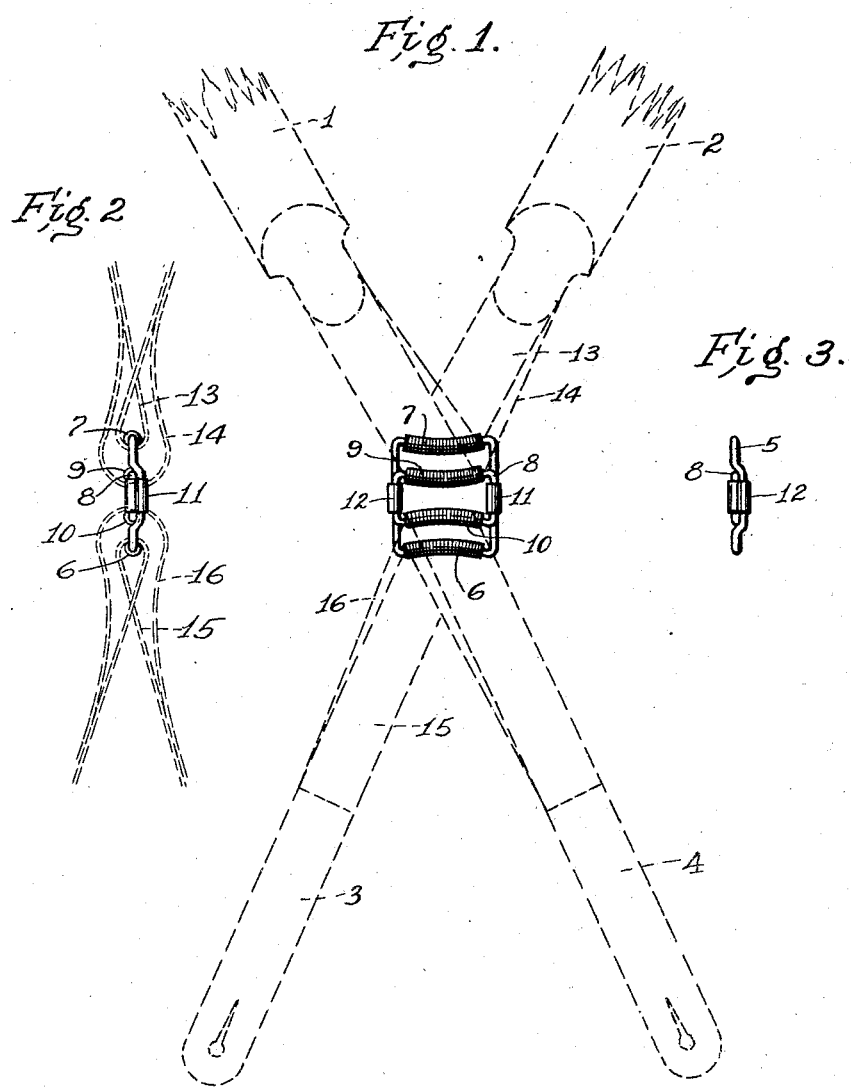

UNITED STATES PATENT OFFICE.

JOHN F. BEAR, OF MANSFIELD, OHIO, ASSIGNOR TO THE OHIO SUSPENDER COMPANY, OF MANSFIELD, OHIO, A CORPORATION OF OHIO.

SUSPENDER-LINK.

1,341,033.	Specification of Letters Patent.	Patented May 25, 1920.

Application filed September 15, 1919. Serial No. 323,777.

*To all whom it may concern:*

Be it known that I, JOHN F. BEAR, a citizen of the United States of America, residing at Mansfield, in the county of Richland and State of Ohio, have invented certain new and useful Improvements in Suspender-Links, of which the following is a specification.

This invention relates to a suspender link.

The primary object of the present invention is to provide a suspender link with a series of alined bearings and loosely mount thereon coil spring rollers to provide for a yielding or flexing contact between the coil spring rollers and the suspender tapes.

Another object is to construct a suspender link with means of connecting the cross-shoulder straps and trouser straps through the medium of yielding tapes and coil spring roller connections thereby providing double acting and yielding connections between them.

A further object is to construct a suspender link in such a manner as to afford facilities for mounting coil spring rollers upon the bearings of the link.

A further object is to provide a suspender link that will obviate undue friction of the tapes in traveling over the coil spring rollers and link and to automatically maintain the tapes on the central portions of the coil spring rollers.

Another object is to construct a suspender link of a minimum number of parts, simple in construction, but which will accomplish the results and objects herein referred to.

These and other objects are attained by the mechanism illustrated in the drawing in which:

Figure 1 is an elevation of the suspender link showing the suspender tapes attached to the rear trouser suspender straps and interlaced with and engaging the suspender link. It also shows suspender tapes attached to the cross-shoulder straps of a conventional type of suspender and interlaced with and engaging the suspender link.

Fig. 2 is a side view of Fig. 1 partially broken away.

Fig. 3 is a side view of the suspender link.

In the drawing reference numerals 1 and 2 represent the shoulder straps of a conventional type of suspender, 3 and 4 the rear trouser straps thereof, which are yieldingly connected together through the medium of a plurality of tapes, the body portion thereof being interlaced between the bearings of a novel suspender link to engage and travel over flexible rollers which are mounted on said bearings.

In the application of the invention to a conventional type of suspender the link is preferably made of round wire. The wire is formed or bent to provide a substantially rectangular shaped main yoke 5. The sides of the yoke are depressed at or about the center of the yoke as shown in Fig. 3 for a purpose which will be described hereinafter. The ends of the yoke 5 are bent or bowed inwardly to provide bearings having crown faces in opposed relation to each other. Coil spring rollers 6 and 7 are loosely journaled upon the crown face bearings of the yoke 5 and are adapted to be rotated thereon. An auxiliary yoke 8 formed similar to the yoke 5 hereinbefore described except as to dimensions is provided. The auxiliary yoke 8 is preferably made of such dimensions as to permit its sides to nest snugly within the depressions formed in the main yoke thereby providing means for alining all of the bearings of both yokes when they are fastened together. The bearings or end portions of the auxiliary yoke are also bent or bowed inwardly in opposed relation to each other to present opposing crown face bearings toward each other. Coil spring rollers 9 and 10 are mounted thereon. The main and auxiliary yokes are then fastened and secured together securely by sheet metal clamps or the like 11 and 12.

In connecting the shoulder straps to the rear trouser straps through the medium of the novel link described four tapes are preferably employed and applied as follows: A tape 13 is attached at one end by any conventional means so as to contact with and travel over the coil spring roller 7 and the opposite end of the tape 13 is then attached to the shoulder strap 1. Another tape 14 is also attached at one end to the shoulder straps 2 and then laced with the suspender link so as to contact with and travel over the coil spring roller 9 and the opposite end of the tapes is attached to the shoulder strap 1, thereby flexibly and yieldingly connecting the shoulder straps to the suspender link. The tapes 15 and 16 are interlaced with the suspender link and attached to the trouser straps in exactly the same manner as hereinbefore described with reference to the shoulder straps.

It will be observed that in the application of the link to suspenders and in employing the tapes in the manner described for connecting the parts together that yielding functions take place between the connections to the link that is double acting that is, the shoulder straps are yieldingly connected to the link and the trouser straps are also yieldingly connected to the link, thereby providing double yielding connections between the shoulder straps and trouser straps. Attention is further called to the fact that the shape of the bearings provide a crown face which tends to direct the travel of the tapes toward the center of the bearings thereby preventing undue friction and wear of the edges of the tapes. It will further be noted that the rollers on account of being made of spring wire will flex, turn, bow or twist without breaking and will yield to pressure in response to an irregular pull or strain and rebound back to its normal position automatically.

Immaterial alterations or changes can be made in the structure herein described or in its application to a suspender without departing from the spirit of the present invention.

I claim:

1. In a suspender link, a rectangular frame having the top and bottom portion thereof bent inwardly toward the center thereof and yielding coil springs loosely mounted thereon.

2. In a suspender link, a rectangular frame having the top and bottom portion thereof bent inwardly toward the center thereof and flexible members loosely mounted thereon.

3. In a suspender link, a rectangular frame having the top and bottom portion thereof bent inwardly toward the center thereof and flexible members loosely mounted thereon, an auxiliary frame having curved bearings mounted thereon, means to fasten said auxiliary frame to the first mentioned frame and flexible members mounted on said curved bearings of the last mentioned frame.

4. In a suspender link, a rectangular frame having the upper and lower portions thereof curved inwardly in opposed relation to each other, an auxiliary frame provided with bearings curved in opposed relation to each other, means to fasten said frames together, and coil springs loosely mounted on the curved portions of said frames.

5. In a suspender link, a rectangular frame having the upper and lower portion thereof curved in opposed relation, coil springs loosely mounted thereon, an auxiliary rectangular frame having curved bearings formed thereon in opposed relation to each other and means to secure said auxiliary frame to the first mentioned frame so as to arrange four bearings in alinement, two of said bearings being curved and arranged in opposed relation to the other two when assembled as described and set forth.

6. In a suspender link, a rectangular frame provided with depressed side portions and curved bearings which are formed in opposed relation to each other, coil springs loosely mounted thereon, an auxiliary frame provided with curved bearings and adapted to nest in the depressed portions so as to position all the bearings in substantial alinement with each other and means to fasten said rectangular frames together as and for the purpose described.

7. In a suspender link comprising two wire yokes which are provided with curved bearings in opposed relation to each other, coil springs loosely mounted on said bearings and means to securely fasten said frames together as and for the purpose described.

8. In a suspender link, two rectangular frames of different sizes each of which are provided with opposed curved bearings, coil springs mounted on said bearings and means of fastening said frames together so as to position all of said bearings in substantial alinement with each other as and for the purpose described.

In testimony whereof I affix my signature.

JOHN F. BEAR.